April 28, 1936.  F. KNILL  2,038,940
FISH LURE
Filed June 12, 1935
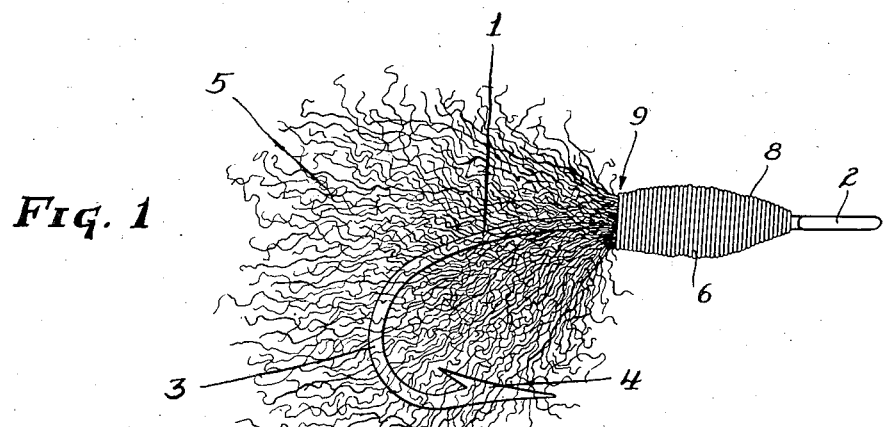
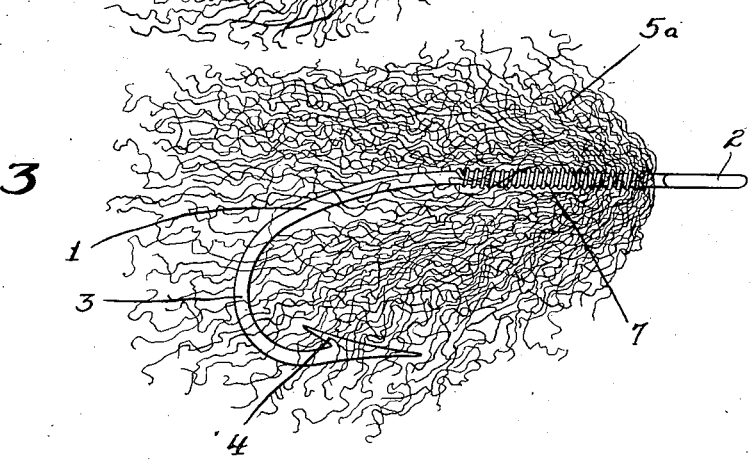
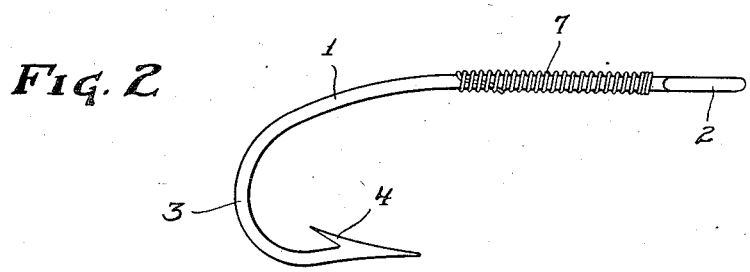
INVENTOR
FRANK KNILL
BY
Bates, Goldrick, & Teare
ATTORNEYS Patented Apr. 28, 1936

2,038,940

UNITED STATES PATENT OFFICE 2,038,940

FISH LURE

Frank Knill, Cleveland, Ohio

Application June 12, 1935, Serial No. 26,137

4 Claims. (Cl. 43—48)

In so-called fly fishing it has heretofore been nearly impossible for the fisherman to maintain the lure in a life-like condition during repeated casts at short intervals, due to the fact that when wet, the ordinary fly loses its life-like appearance and looks either dead or obviously artificial. The feathers, hairs, fibers, etc., of which such lure is usually made, tend to become matted together when wet, and the fly loses its attractiveness for the fish. Moreover, when the fibers, etc. become matted, a larger portion of the hook becomes exposed than is ordinarily visible and the fish perceiving the hook refuses to take the fly.

One object of this invention is to provide a self-drying fly and method of making the same. Another is to provide a fly that will have less tendency to expose the hook, even when somewhat wet. A further object is to provide a fly which, while capable of being colored or otherwise decorated as desired, to best attract the coveted fish, will at all times be vague as to outline, to the end that the more wary or cautious fish will be more effectively lured thereby.

A further object is to provide a fly having considerable effective hook-concealing bulk, yet with no appreciable mass, and which will offer practically no resistance tending to prevent the barb from hooking the fish, once such fish has taken the fly.

A preferred embodiment of the invention is illustrated herewith and described below.

In the accompanying drawing, Fig. 1 is a side elevation, (considerably enlarged) showing the improved fly in association with an ordinary fish hook; Fig. 2 is a similar view illustrating a first step in forming the lure, and Fig. 3 is a similar view showing a second step.

As shown in Fig. 1, the hook in general comprises a wire shank 1, having for example an eye 2 for attachment of the leader, and a hook portion at 3 having a barbed point 4. The lure element is illustrated at 5, and the preferred fastening means for said element at 6.

The lure element preferably comprises the tuft of raw wool—sheep's or lamb's wool, for example—of such grade that it is highly fluffy. In other words, the wool is of a grade in which the fibers are fine and curly, so that the tuft has the tendency to spread out and remain in that condition, even though damp.

The tuft is large enough to substantially conceal the hook proper and its barb when casually viewed from any possible angle.

Such concealment will result from assembling the tuft onto the shank of the hook, as illustrated in Fig. 3, wherein 5a indicates a loop made by a single folded tuft of wool having fibers of such length as to properly conceal the hook. As a non-slip base for the tuft I wind a suitable strong light filament (say silk or linen thread) about the shank as shown in Fig. 2, preferably in open coils, as at 7. The coils may be caused to adhere to the shank by treating the filament with suitable adhesive, and both ends are appropriately anchored. The folded tuft 5a is then laid into embracing relation to the base, the free ends of the tuft extending on opposite sides of the hook portion, and an attaching filament (preferably finer than the filament 7) is then wound in closely packed tight coils, as at 8, Fig. 1, about the closed end of the fold in the tuft; being finally anchored in suitable fashion as at 9 (anchorage not shown).

The coils 8 which form the fastening 6, bind the tuft firmly against the base coils 7, causing local depression of the wool fibers, between the base coils to effect a non-slip gripping of the tuft fibers on the shank.

The fastening may be augmented by the use of cement or adhesive or by appropriate treatment to render the filament tacky etc., following any known or suitable practice.

While, as stated above the lure element is preferably raw wool, this being highly waterproof, any fine animal hair or its equivalent may be used if given a permanent kink or wave comparable to that of natural wool, and in any event suitable waterproofing treatment may be given the fibers, as by the use of aluminum stearate or acetate salts in a suitable vehicle such as alcohol or carbon tetrachloride to increase penetration of the fibers, as practiced in the dyeing industry.

Any appropriate decoration, as by employing different dyes or colors for different fibers in the tuft, may be practiced, and the decoration may be of any desired pattern; say in simulation of the salient characteristics of the insect represented or suggested by the fly.

During the cast, the individual fibers of the lure element spread out and release the suspended water, and as a result the fly is automatically dried during its passage through the air. This, in practical effect, insures that the fly will be dry at each cast. A further advantage of the described arrangement lies in the hook-concealing character of the tuft, and this effect is enhanced by the insured absence of water when the cast is made. Also the blurred or indistinct outline arising from the fuzzy or fluffy appearance of the fly is of advantage in concealing the actual artificial character of the lure.

I claim:—

1. A fish lure comprising a snaring device having a tuft of fluffy wool covering it in substantially its entirety.

2. A fish lure comprising a barbed hook having a folded tuft of fluffy wool attached thereto, and lying in loosely embracing relation to the barbed portion of the hook on substantially all sides of it and extending for substantially the entire length of the hook.

3. A fish lure comprising a hook and a highly fluffy tuft of fibrous material of such nature as to automatically discharge water therefrom when moved a short distance through the air at a speed normal to that occurring in fly-fishing.

4. A lure for fly fishing, comprising a hook having a base coil of relatively strong fiber filament wound thereon, a folded tuft of wool embracing the coil and covering substantially the entire hook and having a substantially globular shape, and means binding the embracing portion of the tuft tightly and against the base coil.

FRANK KNILL.